United States Patent [19]

Fujii et al.

[11] Patent Number: 4,658,390
[45] Date of Patent: Apr. 14, 1987

[54] OPTICAL FOCUS POSITION CONTROL IN AN OPTICAL MEMORY SYSTEM

[75] Inventors: Yosikazu Fujii; Tetsuya Inui; Toshihisa Deguchi, all of Nara; Hideyoshi Yamaoka, Matsubara, all of Japan

[73] Assignee: Sharp Kabushiki Kaisha, Osaka, Japan

[21] Appl. No.: 600,374

[22] Filed: Apr. 16, 1984

[30] Foreign Application Priority Data

Apr. 18, 1983 [JP] Japan ................................. 58-68771
Mar. 19, 1984 [JP] Japan ................................. 58-53842

[51] Int. Cl.$^4$ ............................................. G11B 7/12
[52] U.S. Cl. ........................................... 369/45; 369/44
[58] Field of Search ............................. 369/44, 45, 46; 250/201; 350/252, 255

[56] References Cited

U.S. PATENT DOCUMENTS

| | | | |
|---|---|---|---|
| 4,100,576 | 7/1978 | Ditthardt | 369/45 X |
| 4,302,830 | 11/1981 | Hamaoka et al. | 369/45 |
| 4,367,543 | 1/1983 | Araki et al. | 369/45 |
| 4,408,313 | 10/1983 | Musha | 369/45 |
| 4,437,177 | 3/1984 | Watabe et al. | 369/45 |
| 4,449,213 | 5/1984 | Noborimoto et al. | 369/45 |
| 4,451,863 | 5/1984 | Yanagida et al. | 360/114 |
| 4,462,096 | 7/1984 | Kusaka | 369/45 |
| 4,479,051 | 10/1984 | Musha | 369/44 |
| 4,481,613 | 11/1984 | Yokota | 369/45 |
| 4,482,986 | 11/1984 | Noda et al. | 369/44 |

FOREIGN PATENT DOCUMENTS

58-12145 1/1983 Japan ................................. 369/45

Primary Examiner—Donald McElheny, Jr.
Attorney, Agent, or Firm—Birch, Stewart, Kolasch and Birch

[57] ABSTRACT

An optical focus position control system in an opto-magnetic disc apparatus includes a tracking control device and a focus control device. The tracking control device includes an intermediate holder, a tracking parallel spring which connects an cylindrical objective lens support to the intermediate holder while ensuring movement of the cylindrical objective lens support in the radial direction of the opto-magnetic disc, and a tracking drive mechanism to shift the cylindrical objective lens support in the radial direction within the intermediate holder. The focus control device includes a stationary holder, a focusing parallel spring which connects the intermediate holder to the stationary holder while ensuring movement of the intermediate holder in the direction of the optical axis of laser beams emitted through the optical focus position control system, and a focusing drive mechanism to shift the intermediate holder in the optical axis direction within the stationary holder.

14 Claims, 8 Drawing Figures

OPTICAL FOCUS POSITION CONTROL IN AN OPTICAL MEMORY SYSTEM

BACKGROUND OF THE INVENTION

1. Field of the Invention

The present invention relates to an optical focus position control device of an optical disc apparatus that records, plays back, and erases a variety of information by irradiating optical beams such as the laser beams onto a recording media. The present invention relates, more particularly, to an optical focus position control device in an opto-magnetic disc apparatus which records, plays back, and erases a variety of information by irradiating optical beams such as laser beams onto a recording medium including a magnetic film.

2. Prior Art

Conventionally, any of the existing optical discs have surfaces which easily vibrate during rotation, and as a result, recording tracks on the disc are displaced in the direction of the optical axis of the incident laser beams that irradiate the disc surface. Also, the recording tracks are adversely affected by any deviation between the center position of the disc and the motor shaft that drives the disc. Recording tracks of such a disc are then displaced in the direction of the disc radius (hereinafter called the radial direction). To prevent any displacement of recording tracks, a device is provided so that the laser beam focus position can be correctly corrected within the optical head mechanism to enable the incident laser beam spot to correctly match the recording tracks of a disc. Such a device is called the optical focus position control in the following description.

Using any of the existing optical discs such as those that only plays back information without containing any magnetic film recording media, or those that can record any additional information, fine adjust the focus position of the incident laser beams (hereinafter called the focus controller) must be accomplished to deal with the disc displacement in the direction of the optical axis of the incident laser beams. A device that can vary the position of the objective lens by means of the electromagnetism is well known by now. On the other hand, to fine adjust the focus position of the incident laser beams (hereinafter called the tracking controller) to deal with the disc displacement in the radial direction, a variety of mechanisms for this fine adjustment of the focus position of the incident laser beams have been introduced which utilize a rotary mirror that reflects the incident laser beams in any optimum direction. The above-mentioned tracking control is not practical because the incident laser beams are inevitably inclined from the perpendicular direction of the disc.

Accordingly, a new proposal has been introduced quite recently, which provides a mechanism capable of jointly performing both the focus and tracking controls mentioned above, by varying the position of the objective lens using electromagnetic force. Basically, such a mechanism comprises a coil that can be moved integrally with an objective lens and a stationary permanent magnet, thus causing the objective lens to be displaced by the current flowing through said coil.

However, this mechanism provides the following problem.

For Example, a problem arises when a mechanism incorporating a cylindrical objective lens support which is supported by rubber material whose one end is secured to a stationary holder, where said cylindrical objective lens support is driven by electromagnetic force existing between the coil secured to said cylindrical objective lens support and the magnetic circuit secured to said stationary cylinder. Since said rubber-elastic material supports the cylindrical objective lens support it cannot fully resist the tilting force of the cylindrical objective lens support, and as a result, any accidental force may be generated when the drive force generated by said electromagnetic force cannot be applied to the gravity center of the cylindrical objective lens support, thus causing said cylinder to eventually generate a rotary movement. This will cause the optical axis of beams to tilt against the center axis of the objective lens, and so either the off-axis astigmation or coma aberration will adversely affect the disc tracks containing information, causing beams to poorly focus on them, and as a result, quality of the recorded information will be degraded significantly.

Furthermore, if such an already known mechanism capable of jointly performing both the focus and tracking controls by varying the position of the objective lens via the electromagnetic force is actually applied to an optical disc apparatus, it will easily create problems described below.

Since the proposed mechanism uses magnetism generated by a permanent magnet, a leakage magnetism or flux will be generated in portions peripheral to the disc. Nevertheless, since the disc uses the magnetic film for the recording media, if such a leakage mechanism adversely affects said magnetic film, the following problems will arise.

(1) When the laser beams are irradiated onto an optical magnetic disc to cause temperature to rise, and simultaneously an information is recorded on said disc via an external magnetism, if a leakage magnetism out from said optical focus position control affects the disc, then the quality of the recorded information will be degraded significantly.

(2) When playing back the recorded information via the magnetic-optical effect by irradiating laser beams onto the optical magnetic disc, any leakage flux from said optical focus position control may adversely affect the disc, thus causing the recorded information to be easily erased.

In the light of these potential disadvantages, if an optical disc apparatus is used, it is quite necessary to completely prevent even the slightest leakage flux from the optical focus position control from seriously affecting the optical disc. In addition, there are still further problems to solve.

OBJECTS AND SUMMARY OF THE INVENTION

Accordingly, an object of the present invention is to provide an improved mechanism for an optical focus position control device by minimizing any adverse effect of the leakage magnetism against the optical disc.

Another object of the present invention is to securely achieve a mechanism that stably drives the objective lens in dual directions, i.e., either in the vertical (up/down) or horizontal (left/right) direction without causing the objective lens to incline by using an optical focus position controller capable of controlling both the tracking and focussing of an optical disc apparatus.

Still another object of the present invention is to stabilize the tracking and focussing movement of the objective lens by improving the damping characteristics of the drive and support mechanism.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a tracking control device for moving an cylindrical objective lens support in the radial direction, and a focus control device for moving the tracking control device in the direction of the optical axis of the incident laser beams are disposed in a stationary housing. The tracking control device includes a movable intermediate supporting unit. The cylindrical objective lens support is supported by the movable intermediate supporting unit via parallel springs which are movable only in the radial direction. The tracking control device further includes an electromagnetic drive unit for shifting the cylindrical objective lens support in the radial direction. The focus control device includes an electromagnetic drive unit for shifting the movable intermediate supporting unit in the direction of the optical axis.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
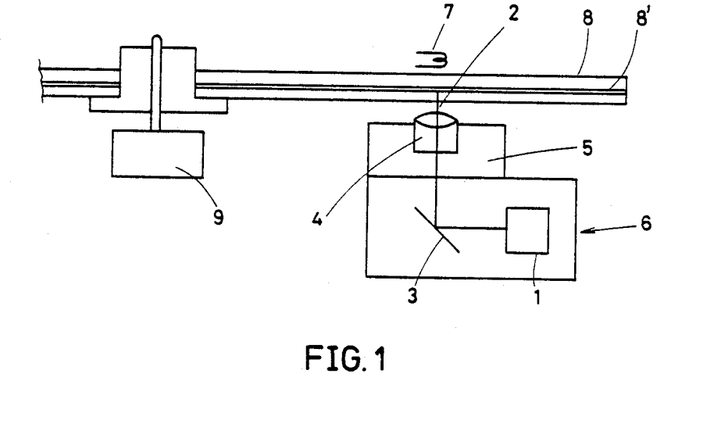
FIG. 1 is a schematic block diagram of an optical disc apparatus.

FIG. 1 shows a simplified block diagram of an optical disc apparatus as a preferred embodiment of the present invention. In FIG. 1, a laser beam source 1 that emits laser beam 2. A mirror 3 redirects the laser beam 2, and an objective lens 4 causes the laser beam 2 to be focussed onto the recording media surface of a disc. An optical focus position control device 5 causes the optical focus position to be accurately followed onto the tracks of the recording media of a disc by driving the objective lens 4 either in the vertical (up/down) or horizontal (left/right) direction. An optical head 6 contains all the optical devices mentioned above. A recording/erasing coil 7 provides that surface of the disc recording media with magnetism while either recording or erasing information. An optical disc 8 incorporating a disc recording media 8' is rotated by a motor 9 that drives said optical disc.

The focus control to be performed by the optical focus position control device 5, i.e., a fine adjustment of the incident laser beam focus position against the disc displacement made in the direction of the incident laser beam axis can be achieved by causing the objective lens 4 to move in the direction of the thickness of said optical disc 8. On the other hand, the tracking control to be performed by said optical focus position control device 5, i.e., a fine adjustment of the incidental laser beam focus position in dealing with the disc displacement in the radial direction can be performed by causing the objective lens 4 to move in the radial direction of the optical disc 8.

Figure 2:
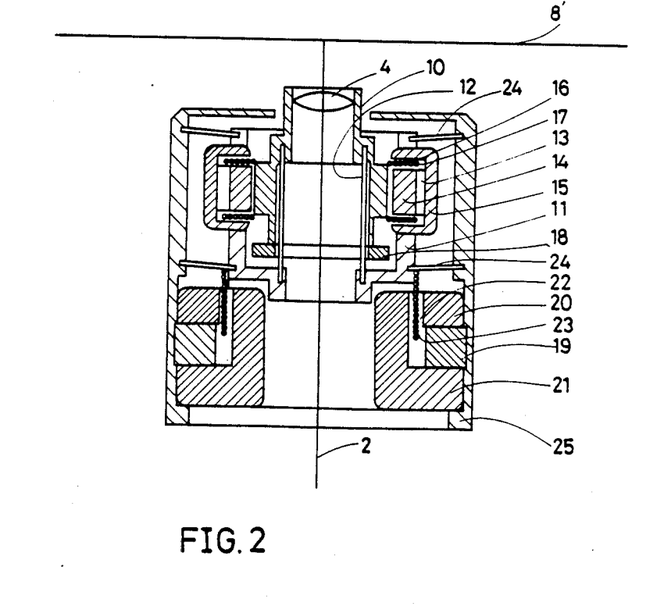
FIG. 2 is a sectional view of an embodiment of an optical focus position control system of the present invention included in the optical disc apparatus of FIG. 1.

FIG. 2 shows a detailed construction of the optical focus position control system 5. First, the tracking control device will be described. An cylindrical objective lens support 10 supports the objective lens 4. The cylindrical objective lens support 10 is supported by a movable intermediate support member 11 via parallel springs 12 so that the cylindrical objective lens support 10 is movable in the radial (left/right), tracking direction with respect to the intermediate support member 11. A tracking permanent magnet 13, a tracking yoke plate 14 and a tracking yoke 15 are secured to the intermediate support member 11, and form, in combination, a closed magnetic circuit. A tracking magnetic space 16 is provided between the tracking yoke plate 14 and the tracking yoke 15. A tracking drive coil 17 is secured to the cylindrical objective lens support 10 across the tracking magnetic space 16. When the tracking control current is led to the tracking drive coil 17, magnetism will be generated in the tracking drive coil 17, and as a result, due to a combined effect with the other magnetism generated by the tracking permanent magnet 13, all the tracking drive coil 17, the cylindrical objective lens support 10, the objective lens 4, and a counter balance 18 are displaced in the radial direction. The counter balance 18 is secured to the bottom of the cylindrical objective lens support 10 so that the tracking drive force is applied to the center of the gravity of the tracking movable elements.

The focus control device will be described below. A focussing permanent magnet 19, a focussing yoke plate 20, and a focussing yoke 21 form, in combination, a closed magnetic circuit. These elements are securely installed to a stationary holder 25 which fully supports the optical focus position control device. A focussing magnetic space 22 is formed between the focussing yoke plate 20 and the focussing yoke 21. A focus drive coil 23 is secured to the movable intermediate support member 11 across the focussing magnetic space 22. The mobable intermediate support member 11 is supported by the stationary holder 25 via parallel springs 24 so that the movable intermediate support member 11 is movable in the vertical direction, namely, in the direction of the incident laser beam axis with respect to the stationary holder 25. When the focus control current is fed to the focus drive coil 23, magnetism is generated in the focus drive coil 23, and as a result, due to a combined effect with the other magnetism generated by the focussing permanent magnet 19, the tracking control device supported by the movable intermediate support member 11 is displaced in the focus direction (direction of the incident laser beam axis).

Next, the movement characteristics of both the focussing and tracking controllers of the cylindrical objective lens support 10 are described below.

(I) Movement characteristics of the tracking controller

As shown in FIG. 2, the tracking controller is driven by the electromagnetic effect that interacts between the tracking closed magnetic circuit secured to the intermediate support member 11 and the tracking drive coil 17 secured to the cylindrical objective lens support 10. The intermediate support member 11 and the cylindrical objective lens support 10 are connected to each other via the elastic material that is workable only to the left and to the right by moving in the radial direction, i.e., via a parallel spring 12 that moves in the direction of the disc radius. Assuming that the weight of the units movable in the tracking direction (the objective lens 4, the cylindrical objective lens support cylinder 10, and the tracking drive coil 17) is MT and the spring constant of the parallel spring 12 moving in the direction of the disc radius is KT, and then the cylindrical objective lens support 10 will have a resonance frequency fT which is represented by a formula $$fT = \frac{1}{2\pi} \sqrt{\frac{KT}{MT}}$$

when the cylindrical objective lens support 10 moves to the left and to the right. When the tracking drive force FT is generated by the interacting electromagnetic force mentioned above with a frequency denoted by fHz, the movement phase delay caused by the displacement XT of the cylindrical objective lens support 10 in the tracking direction is 0° through 90° when $0 < f < fT$, or 90° through 180° when $fT < f$, or near 180° when $fT << f$. When the tracking drive force FT is generated, the delay in the movement phase caused by the displacement XT of the cylindrical objective lens support 10 moving to the tracking target position YT should remain below 180° throughout the frequency bands of the tracking control signal. When a phase advancing compensation circuit is used to advance the phase of the tracking drive signal FT, the phase delay is properly maintained below 180°. This ensures a stable tracking control.

(II) Movement characteristics of the focussing controller

As shown in FIG. 2, the focussing controller is driven by the electromagnetic effect that interacts between the focussing closed magnetic circuit secured to the stationary holder 25 and the focussing drive coil 23 secured to the intermediate support member 11. The intermediate support member 11 and the stationary holder 25 are connected to each other via the parallel spring 24 which is workable only in the vertical direction by moving in the direction of focussing. Assuming that the weight of the movable part in the direction of focussing including the tracking control device is MF, whereas the spring constant of the parallel spring 24 moving in the direction of focussing is KF, and then the cylindrical objective lens support cylinder 10 will be provided with a resonance frequency which is represented by a formula $$fF = \frac{1}{2\pi} \sqrt{\frac{KF}{MF}}$$

(hereinafter called the primary resonance frequency) when performing vertical (up/down) movements. The interim holder 11 and the cylindrical objective lens support 10 are connected to each other via the parallel spring 12 moving in the tracking direction. When the focus driving force is applied to the device, the parallel spring 12 slightly moves in the vertical direction due to its elasticity. Thus, assuming that the spring constant in the focus-direction of the parallel spring 12 is KT', the cylindrical objective lens support 10 will have a resonance frequency (hereinafter called the secondary resonance frequency) represented as $$f'F = \frac{1}{2\pi} \sqrt{\frac{KT'}{MT}}.$$

As described above, whenever the cylindrical objective lens support 10 moves upward and downward, both the primany and secondary resonance frequencies exist. Note that the spring constant KT' in the vertical direction of the parallel spring 12 is considerably large, or $KT' >> KF$. This means that the secondary resonance frequency f'F is significantly higher than the primary resonance frequency fF, the relationship of which is denoted by $f'F > fF$. As soon as a driving force FF for the focussing operation is given by the interacting electromagnetic force, the movement phase delay in the displacement XF caused by the objective lens-mirror 10 in the focussing direction can be represented to be 0° through 90° when $0 < f < fF$, where f (Hz) represents a frequency, whereas such a delay in the movement phase can be represent to be 90° through 270° when $fF < f < f'F$, and it will be 270° through 360° when $f'F < f$. When the focussing drive force FF is generated, the delay in the movement phase caused by the displacement XF of the cylindrical objective lens support 10 moving to the focussing target position YF should remain below 180° throughout the frequency bands of the focussing control signal. As described earlier, even if the phase advancing compensation circuit is used to advance the phase of the focussing drive signal FF, since there is a certain limit for advancing the phase amount, the phase cannot be compensated for in order that it can exceed 180° significantly. To properly compensate for the phase delay, the second resonance frequency fF should be set at an optimum level higher than the frequency band of the focussing control signal. Although frequency bands available for the focussing control signal are variable according to uses, generally, an optical disc apparatus uses 1 through 4 KHz of the frequency bands. As a result, it was made clear that the secondary resonance frequency f'F should be set at a level above 7 KHz.

Means for designing a construction that fully satisfies the above conditions are described below.

As described above, the secondary resonance frequency f'F can be determined by the spring constant KT' of the tracking parallel spring 12 when it moves in the focussing direction and by the weight MT of the moving parts in the tracking direction. The secondary resonance frequency f'F becomes large as the spring constant KT' becomes large and as the weight MT becomes small. Nevertheless, since there is a certain limit in the means for decreasing the weight MT of the objective lens 4 and the cylindrical objective lens support 10, the weight MT of the parts moving in the tracking direction cannot be decreased significantly. (Normally, the weight MT is designed in a range from 0.5 to 10 grams.) The inventors followed up trials for increasing the spring constant KT' of the tracking parallel spring 12 during its movement in the vertical direction. The spring constant KT' was found to be $KT'/KT=(XT/YT)^2$ when the tracking parallel spring 12 had a length XT in the focus direction YT. As a result, it is clear that the spring constant KT' in the vertical direction (up/down) can be increased by expanding the length XT and decreasing the thickness YT of the parallel spring 12. In the light of the relationship denoted by $$\frac{f'F}{fT} = \sqrt{\frac{KT'}{KT}},$$

the secondary resonance frequency f'F can be obtained by an equation $$f'F = \frac{XT}{YT} \cdot fT.$$

It was eventually made clear that the tracking parallel spring 12 should be designed so that it can be provided with 20 through 50 micron meter of the thickness YT and an actual length that is 100 up to 500 times the thickness YT. If the tracking parallel spring 12 can be correctly designed in accordance with the findings described above, the delay in the movement phase caused by the displacement XF of the objective lens 4 against the focussing target position can be decreased below 180° within the frequency bands available for the focussing control signal. It is important that the phase advancing compensation circuit be used for correctly compensating for the movement phase.

According to the results of the trials followed up by the inventors, very stable focussing and tracking controls were actually achieved by using a tracking parallel spring 12 made from beryllium-copper alloy having 30 through 50 micron meters of the thickness.

(III) Damping Characteristics Improvement in the Tracking Control Device and the Focus Control Device As discussed above in the sections (I) and (II), there are two kinds of the resonance frequencies fF and fT when the tracking control device and the focus control device are operated. If the damping characteristics in the directions of focussing and tracking control remain negligible, the resonance multiple factor in the resonance frequencies fF and fT will grow, thus causing any interference vibration to easily occur during either the focussing or tracking control operation. Also, when a certain frequency above the resonance frequency level is fed, the phase in responding to the displacement of the movable parts will be extremely delayed to a point very close to 180°, which will result in an extremely unstable optical focus position control operation. To prevent this and ensure satisfactory amount of the damping characteristics, the present invention effectively provides the following means.

(III-a) Structure of the primary means

The primary improvement includes a latexed damping member painted on the focussing parallel spring and/or the tracking parallel spring. (Plate rubber attached to the metal spring by an adhesive is not suitable for the device, because the spring constant becomes high due to the adhesive.) To make up the damping material, viscose-elastic materials such as silicon rubber, butyl rubber, silicon-butyl rubber, and acrylic-ethylene rubber, foaming synthetic resin such as foamed polyurethane, and viscose fluid such as silicon grease, can be used.

(III-b) Structure of the second means

Figure 3:
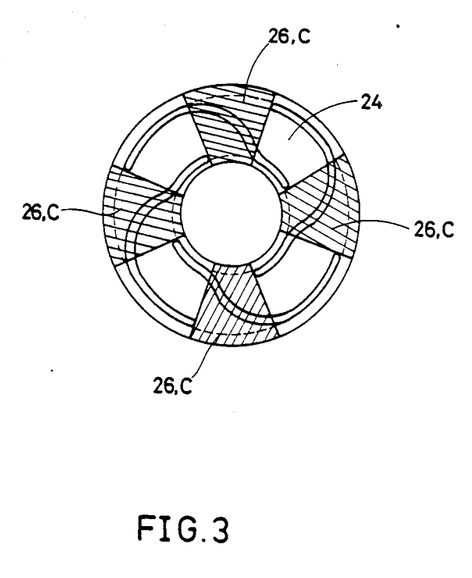
FIG. 3 is a plan view of parallel springs included in the optical focus position control system of FIG. 2.

FIG. 3 shows a plane view of the focussing parallel spring 24. The focussing parallel spring 24 has a structure that connects two concentric circles, where two flat sheet springs, each being connected to four arms at the edges, are provided in the upper and lower positions. The parallel spring 24 moving in the direction of focus causes the intermediate holder 11 to move only in the vertical direction with respect to the stationary holder 25. (see FIG. 2.) Damping material 26 is bonded to the portion C of the surface of the focussing parallel spring 24, where the largest amount of the relative displacement exists, thus resulting in greater damping characteristics in the direction of focus. To make up the damping material 26, viscose-elastic materials such as silicon-rubber, butyl rubber, silicon-butyl rubber, and acrylic-ethylene rubber, and foaming synthetic resin such as foamed polyurethane, can be used.

(III-c) Structure of the third means

The third improvement is to form the focussing parallel spring and/or the tracking parallel spring with a vibration-proof alloy such as manganese-copper alloy, ferro-aluminum alloy, nickel-titanium alloy, and magnesium alloy.

The structures of (III-a), (III-b) and (III-c) can be effectively combined with each other to significantly enhance the damping characteristics.

(IV) Improvement in connection with the application of the present optical focus position controlling device to an opto-magnetic disc apparatus The present invention provides a variety of means for effectively preventing the optical focus position control device from causing its leakage mangetism to adversely affect the recording media 8' of the optical disc 8. Such effective means are described below.

(IV-a) Details of means related to the focus controller

Figure 4A:
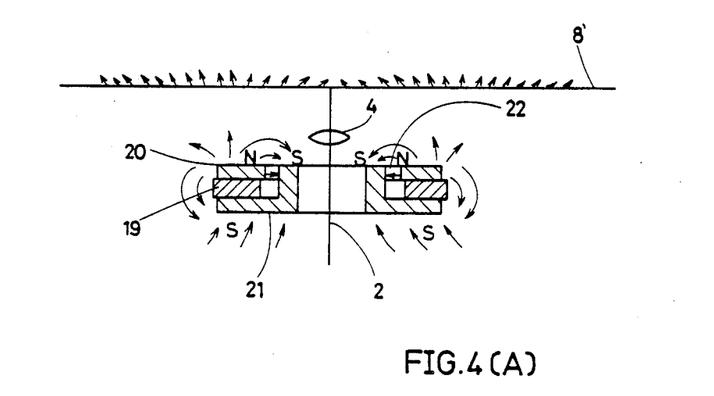
FIGS. 4(A) and 4(B) are sectional views for explaining an operational mode of a focus control unit included in the optical focus position control system of FIG. 2.
Figure 4B:
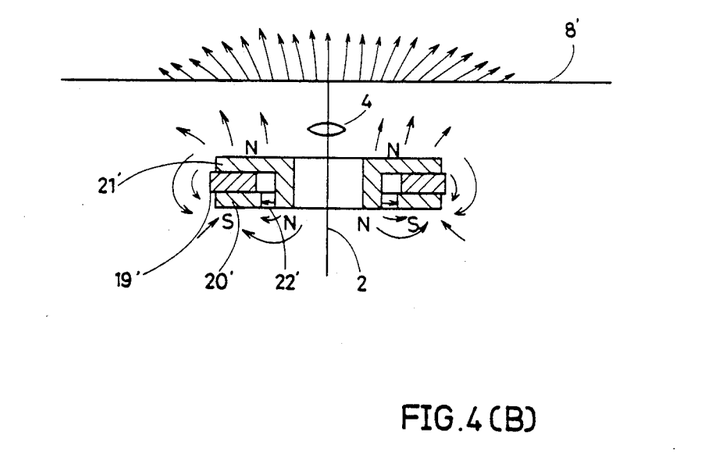

FIG. 4(A) shows a sectional view of a focus controller incorporating an improved means as a preferred embodiment of the present invention, whereas FIG. 4(B) shows a sectional view of the other focus controller without incorporating any improved means. Symbols N and S respectively denote the north and south poles. As shown in FIG. 3(A), the focus controller incorporating an improved means related to the present invention provides magnetic space 22 available for the focussing operation in an area close to the optical disc. This construction minimizes leakage magnetism that otherwise adversely affects the recording media 8' of the optical disc. In other words, leakage magnetism will significantly affect the surface of the recording media 8' of the optical disc if the magnetic space 22' for the focussing operation is provided in an area remote from the optical disc as shown in FIG. 3(B). Length of each arrow in FIGS. 3(A) and 3(B) denotes the intensity of the leakage magnetism at the respective position, while the direction of the leakage magnetism is shown in the arrowed direction.

(IV-b) Details of means related to the tracking controller

Figure 5A:
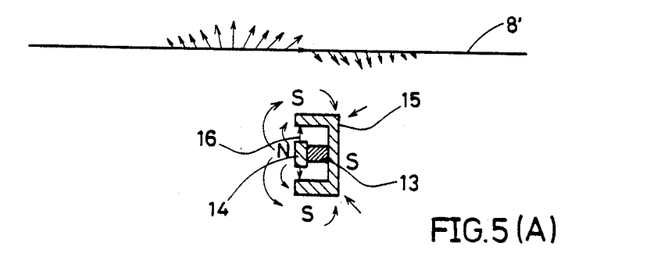
FIGS. 5(A), 5(B), and 5(C) are sectional views for explaining an operational mode of a tracking control unit included in the optical focus position control system of FIG. 2.
Figure 5B:
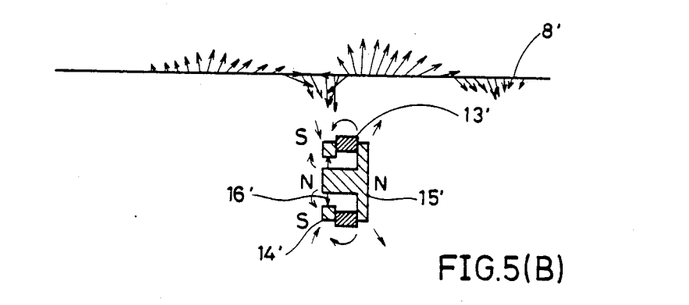
Figure 5C:
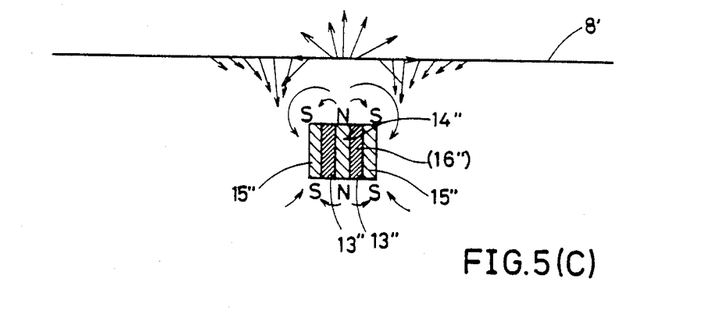

FIG. 5(A) shows a sectional view of the tracking controller incorporating an improved means as a preferred embodiment of the present invention, whereas FIGS. 5(B) and 5(C) show sectional views of the other tracking controller without incorporating any improved means. The tracking controller incorporating an improved means related to the present invention provides the permanent magnet 13 available for the tracking operation in the center position of the closed magnetic circuit. This construction minimizes leakage magnetism that otherwise adversely affects the recording media 8' of the optical disc. In other words, in such a construction where the permanent magnet 13' available for the tracking operation is provided encircling the closed magnetic circuit as shown in FIG. 5(B), or in such a construction where the open magnetic circuit faces the optical disc as shown in FIG. 5(C), if the magnitude of magnetism that functions in the magnetic space 16' or 16" is designed to be equal to said magnetic space 16 of FIG. 5(A) available for the tracking operation, leakage magnetism will significantly affect the surface of the recording media 8' of the optical disc.

(IV-c) Details of means for supporting the tracking control device

When the magnetic field in the tracking magnetic space is selected at a fixed value, the leakage magnetism becomes large as the gap of the tracking magnetic space becomes large. Thus, it is preferable that the gap of the tracking magnetic space be made as narrow as possible. The objective lens must be movable in two dimensions, namely, up/down and left/right. If both of the tracking control magnetic circuit and the focus control magnetic circuit are supported by the stationary holder, the tracking coil must be movable in the two dimensions within the tracking magnetic space. This requires a wide magnetic space.

In accordance with the present invention, the tracking magnetic circuit is supported by the movable intermediate holder 11. By this construction, the tracking drive coil 17 is required to move only in the left/right direction within the tracking magnetic space 16. This will effectively minimize the gap of the tracking magnetic space 16, and the leakage magnetism.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical focus and positioning control device for controlling the optical focus and position of an optical beam such as a laser beam in an optical disc apparatus, the optical focus position control device comprising:
an objective lens;
lens support means for supporting said objective lens;
a stationary holder;
tracking control means for shifting said lens support means in the radial direction of the optical disc, said tracking control means including,
a movable intermediate holder,
tracking parallel spring means for connecting said lens support means to said intermediate holder in a manner to allow said lens support means to move in with respect to said intermediate holder in the radial direction of the optical disc, and
electromagnetic tracking drive means, having a closed magnetic circuit mounted for movement with said intermediate holder, for shifting said lens support means in said radial direction within said intermediate holder, said closed magnetic circuit minimizing flux leakage therefrom; and
focus control means for shifting said tracking control means in the direction of the optical axis of said optical beam, said focus control means including,
focusing parallel spring means for connecting said intermediate holder to said stationary holder in a manner to allow said intermediate holder to move with respect to said stationary holder in said optical axis direction and
electromagnetic focus drive means for shifting said intermediate holder in said optical axis direction within said stationary holder, said electromagnetic focus drive means including a closed magnetic circuit to minimize flux leakage therefrom
said electromagnetic focus drive means comprising,
a focusing permanent magnet creating said closed magnetic circuit,
a focusing yoke plate supporting said focusing permanent magnet,
a focusing yoke mounted on said stationary holder and supporting said focusing yoke plate,
a focusing magnetic space formed between said focusing yoke plate and said focusing yoke, and
a focusing drive coil disposed in said focusing magnetic space so as to cross said focusing magnetic space,
wherein said focusing magnetic space is located close to an optical disc when installed in said optical disc apparatus, and
wherein said focusing parallel spring means includes,
a parallel metal spring and
a latexed acrylic-ethylene rubber attached to the surface of said parallel metal spring.

2. An optical focus and positioning control device for controlling the optical focus and position of an optical beam such as a laser beam in an optical disc apparatus, the optical focus position control device comprising:
an objective lens;
lens support means for supporting said objective lens;
a stationary holder;
tracking control means for shifting said lens support means in the radial direction of the optical disc, said tracking control means including,
an intermediate holder,
tracking parallel spring means for connecting said lens support means to said intermediate holder in a manner to allow said lens support means to move with respect to said intermediate holder in the radial direction of the optical disc, said tracking parallel spring means including a parallel spring formed of a vibration-proof alloy, and
electromagnetic tracking drive means for shifting said lens support means in said radial direction within said intermediate holder, and
focus control means for shifting said tracking control means in the direction of the optical axis of said optical beam, said focus control means including,
focusing parallel spring means for connecting said intermediate holder to said stationary holder in a manner to allow said intermediate holder to move with respect to said stationary holder in said optical axis direction, and
electromagnetic focus drive means for shifting said intermediate holder in said optical axis direction within said stationary holder.

3. An optical focus and positioning control device for controlling the optical focus and position of an optical beam such as a laser beam in an optical disc apparatus, the optical focus control device comprising:

an objective lens;
lens support means for supporting said objective lens;
a stationary holder;
tracking control means for shifting said lens support means in the radial direction of the optical disc, said tracking control means including,
a movable intermediate holder,
tracking parallel spring means for connecting said lens support means to said intermediate holder in a manner to allow said lens support means to move in with respect to said intermediate holder in the radial direction of the optical disc, and
electromagnetic tracking drive means, having a closed magnetic circuit mounted for movement with said intermediate holder, for shifting said lens support means in said radial direction within said intermediate holder, said closed magnetic circuit minimizing flux leakage therefrom; and
focus control means for shifting said tracking control means in the direction of the optical axis of said optical beam, said focus control means including,
focusing parallel spring means for connecting said intermediate holder to said stationary holder in a manner to allow said intermediate holder to move with respect to said stationary holder in said optical axis direction and
electromagnetic focus drive means for shifting said intermediate holder in said optical axis direction within said stationary holder, said electromagnetic focus drive means including a closed magnetic circuit to minimize flux leakage therefrom,
said electromagnetic tracking drive means comprising,
a tracking permanent magnet creating said closed magnetic circuit;
a tracking yoke plate supporting said tracking permanent magnet;
a tracking yoke mounted on said intermediate holder and supplying said tracking yoke plate;
a tracking magnetic space formed between said tracking yoke plate and said tracking yoke; and
a radial drive coil disposed in said tracking magnetic space so as to cross said tracking magnetic space, and
wherein said tracking parallel spring means includes,
a parallel metal spring and
a latexed acrylic-ethylene rubber attached to the surface of said parallel metal spring.

4. The optical focus position control device of claim 3, wherein said parallel metal spring has a length XT in said optical axis direction, and a thickness YT, which satisfy the condition:

$$100 \leq XT/YT \leq 500.$$

5. An optical focus and positioning control device for controlling the optical focus and position of an optical beam such as a laser beam in an optical disc apparatus, the optical focus position control device comprising:
an objective lens;
lens support means for supporting said objective lens;
a stationary holder;
tracking control means for shifting said lens support means in the radial direction of the optical disc, said tracking control means including,
an intermediate holder, tracking parallel spring means for connecting said lens support means to said intermediate holder in a manner to allow said lens support means to move with respect to said intermediate holder in the radial direction of the optical disc, said tracking parallel spring means including,
a parallel metal spring, and
a viscose-elastic material attached to the surface of said parallel metal spring, and
electromagnetic tracking drive means for shifting said lens support means in said radial direction within said intermediate holder,; and
focus control means for shifting said tracking control means in the direction of the optical axis of said optical beam, said focus control means including,
focusing parallel spring means for connecting said intermediate holder to said stationary holder in a manner to allow said intermediate holder to move with respect to said stationary holder in said optical axis direction; and
electromagnetic focus drive means for shifting said intermediate holder in said optical axis direction within said stationary holder.

6. The optical focus position control device of claim 5, wherein said parallel spring has a length XT in said optical axis direction, and a thickness YT, which satisfy the condition:

$$100 \leq XT/YT \leq 500.$$

7. The optical focus position control device of claim 5, wherein said viscose-elastic material is an acrylic-ethylene rubber.

8. The optical focus position control device of claim 5, wherein said viscose-elastic material is a latexed rubber.

9. The optical focus position control device of claim 8, wherein said latexed rubber is a latexed acrylic-ethylene rubber.

10. An optical focus and positioning control device for controlling the optical focus and position of an optical beam such as a laser beam in an optical disc apparatus, the optical focus position control device comprising:
an objective lens;
lens support means for supporting said objective lens;
a stationary holder;
tracking control means for shifting said lens support means in the radial direction of the optical disc, said tracking control means including,
an intermediate holder
tracking parallel spring means for connecting said lens support means to said intermediate holder in a manner to allow said lens support means to move with respect to said intermediate holder in the radial direction of the optical disc, and
electromagnetic tracking drive means for shifting said lens support means in said radial direction within said intermediate holder; and
focus control means for shifting said tracking control means in the direction of the optical axis of said optical beam, said focus control means including,
focusing parallel spring means for connecting said intermediate holder to said stationary holder in a manner to allow said intermediate holder to move with respect to said stationary holder in said optical axis direction, said focusing parallel spring means including,
a parallel metal spring, and
a viscose-elastic material attached to the surface of said parallel metal spring, and electromagnetic focus drive means for shifting said intermediate holder in said optical axis direction within said statutory holder.

11. The optical focus position control device of claim 10, wherein said viscose-elastic material is an acrylic-ethylene rubber.

12. The optical focus position control device of claim 10, wherein said viscose-elastic material is a latexed rubber.

13. The optical focus position control device of claim 12, wherein said latexed rubber is a latexed acrylic-ethylene rubber.

14. The optical focus position control device of claim 10, wherein said parallel metal spring is made of a vibration-proof alloy.

* * * * *